US011406851B2

(12) United States Patent
Novotny et al.

(10) Patent No.: US 11,406,851 B2
(45) Date of Patent: Aug. 9, 2022

(54) FALL PROTECTION LOCKING SYSTEM

(71) Applicant: Honeywell International Inc., Morris Plains, NJ (US)

(72) Inventors: Josef Novotny, Kuncina (CZ); Pavel Marak, Brno (CZ); Jan Hrouzek, Brno (CZ); Frank Muessig, Schewarzenbach am Wald (DE); Denis Mizin, Brno (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 293 days.

(21) Appl. No.: 16/746,356

(22) Filed: Jan. 17, 2020

(65) Prior Publication Data
US 2021/0220680 A1    Jul. 22, 2021

(51) Int. Cl.
*A62B 35/04* (2006.01)
*A62B 35/00* (2006.01)

(52) U.S. Cl.
CPC .......... *A62B 35/04* (2013.01); *A62B 35/0081* (2013.01)

(58) Field of Classification Search
CPC ............................ A62B 35/04; A62B 35/0081
See application file for complete search history.

(56) References Cited

U.S. PATENT DOCUMENTS

| 4,034,828 A | 7/1977 | Clarence et al. |
| 5,799,760 A | 9/1998 | Small |
| 6,457,556 B1 * | 10/2002 | Skade ................ A62B 35/04 182/18 |
| 6,530,454 B1 | 3/2003 | Renton et al. |
| 8,550,225 B2 * | 10/2013 | Blomberg ............ A62B 35/04 188/371 |
| 9,132,297 B2 * | 9/2015 | Casebolt ................ A62B 1/14 |
| 9,168,402 B2 * | 10/2015 | Casebolt ............... A62B 35/04 |
| 9,636,528 B2 | 5/2017 | Casebolt et al. |
| 10,953,247 B2 * | 3/2021 | Muessig ............... A63B 29/02 |
| 2009/0133977 A1 | 5/2009 | Warren |

(Continued)

FOREIGN PATENT DOCUMENTS

| AU | 2008300650 B2 | 5/2013 |
| EP | 0678310 A1 | 10/1995 |

(Continued)

OTHER PUBLICATIONS

Extended European Search Report issued in European Application No. 21150803.1 dated Apr. 26, 2021, 8 pages.

*Primary Examiner* — Anita M King
(74) *Attorney, Agent, or Firm* — Alston & Bird LLP (57) ABSTRACT

A locking system for fall protection and a method of manufacturing the same are provided. An example locking system includes a housing. The housing defines a guide path through which the housing is slideably attached to a guide member. The locking system also includes a braking lever having a braking end that is configured to engage the guide member. The braking lever includes a shock absorber configured to deform during a fall instance. The locking system further includes a secondary braking feature configured independent from the braking lever. The secondary braking feature is an inertial structure configured to rotate into engagement with the guide member during the fall instance. A corresponding method of manufacturing is also provided.

22 Claims, 12 Drawing Sheets

(56) References Cited

U.S. PATENT DOCUMENTS

| | | |
|---|---|---|
| 2011/0186382 A1 | 8/2011 | Sudale et al. |
| 2011/0186388 A1* | 8/2011 | Sudale .................... A62B 1/14 |
| | | 188/65.2 |
| 2014/0020983 A1 | 1/2014 | Casebolt et al. |
| 2015/0114752 A1* | 4/2015 | Bornack ................. A62B 1/14 |
| | | 182/5 |
| 2016/0130875 A1 | 5/2016 | Hwang |
| 2019/0099625 A1 | 4/2019 | Muessig |
| 2021/0128955 A1* | 5/2021 | Marak ................ A62B 35/0037 |
| 2021/0299490 A1* | 9/2021 | Sulc .................. A62B 35/0081 |

FOREIGN PATENT DOCUMENTS

| | | |
|---|---|---|
| EP | 1683551 A1 | 7/2006 |
| EP | 2200702 B1 | 2/2011 |
| WO | 2017/030558 A1 | 2/2017 |

\* cited by examiner

FALL PROTECTION LOCKING SYSTEM

TECHNOLOGICAL FIELD

An example embodiment relates generally to fall protection systems and, more particularly, to fall protection locking systems.

BACKGROUND

From recreation to survival devices, fall protection devices are instrumental in preserving the safety of users during traversal of uncertain conditions and heights. In order to operate effectively, protection devices must be able to freely travel along a guide member to allow freedom of movement, while also allowing for quick and effective activation of the braking mechanism without damaging the guide member. Applicant has identified a number of deficiencies and problems associated with current fall protection devices. Through applied effort, ingenuity, and innovation, many of these identified problems have been solved by the methods and apparatus of the present disclosure.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a locking system is provided for fall protection. The locking system includes a housing. The housing defines a guide path through which the housing is slideably attached to a guide member. The locking system also includes a braking lever having a braking end that is configured to engage the guide member. The braking lever includes a shock absorber configured to deform during a fall instance. The locking system further includes a secondary braking feature configured independent from the braking lever. The secondary braking feature is an inertial structure configured to rotate into engagement with the guide member during the fall instance.

In some embodiments, the secondary braking feature defines a braking surface, and a center of gravity of the secondary braking feature is towards the braking surface. In some embodiments, the secondary braking feature is spring biased against rotation due to gravity in an instance in which the locking system has little or no movement. In some embodiments, the braking surface of the secondary braking feature defines a curvature, such that the braking surface is able to grip the guide member. In some embodiments, the braking surface of the secondary braking feature further defines one or more grooves configured to increase the friction between the secondary braking feature and the guide member.

In some embodiments, the locking system also includes a guide wheel assembly. In such an embodiment, the guide wheel assembly includes a guide wheel locking plate pivotally attached to the housing and a thumb switch configured to move between an engaged position and a disengaged position within an engagement slot. In some embodiments, the thumb switch defines an inner button and an outer button and the engagement slot defines an engaged portion and a disengaged portion. In some embodiments, the engaged portion of the engagement slot defines a diameter that is greater than the diameter of the inner button and the outer button. In some embodiments, the disengaged portion of the engagement slot defines a thickness that is greater than the diameter of the outer button and the thickness is less than the diameter of the inner button. In such an embodiment, the thumb switch must be depressed in an instance in which the thumb switch is travelling through the disengaged portion. In some embodiments, the guide wheel and the thumb switch are concentric. In some embodiments, the shock absorber defines a double spiral shape.

In another example embodiment, a method of manufacturing a locking system is provided for fall protection. The method includes providing a housing. The housing defines a guide path through which the housing is slideably attached to a guide member. The method also includes rotatably attaching a braking lever having a braking end that is configured to engage the guide member. The braking lever includes a shock absorber configured to deform during a fall instance. The method further includes rotatably attaching a secondary braking feature configured independent from the braking lever. The secondary braking feature is an inertial structure configured to rotate into engagement with the guide member during the fall instance.

In some embodiments, the secondary braking feature defines a braking surface, and a center of gravity of the secondary braking feature is towards the braking surface. In some embodiments, the secondary braking feature is spring biased against rotation due to gravity in an instance in which the locking system has little or no movement. In some embodiments, the method also includes providing a curvature along the braking surface of the secondary braking feature, such that the braking surface is able to grip the guide member. In some embodiments, the method also includes providing one or more grooves along the braking surface of the secondary braking feature configured to increase the friction between the secondary braking feature and the guide member.

In some embodiments, the method also includes attaching a guide wheel assembly to the housing. In such an embodiment, the guide wheel assembly includes a guide wheel locking plate pivotally attached to the housing and a thumb switch configured to move between an engaged position and a disengaged position within an engagement slot. In some embodiments, the thumb switch defines an inner button and an outer button and the engagement slot defines an engaged portion and a disengaged portion. In some embodiments, the engaged portion of the engagement slot defines a diameter that is greater than the diameter of the inner button and the outer button. In some embodiments, the disengaged portion of the engagement slot defines a thickness that is greater than the diameter of the outer button and the thickness is less than the diameter of the inner button. In such an embodiment, the thumb switch must be depressed in an instance in which the thumb switch is travelling through the disengaged portion. In some embodiments, the guide wheel and the thumb switch are concentric. In some embodiments, the shock absorber defines a double spiral shape.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As discussed herein, the protection devices may be referred to use by humans, but may also be used to raise and lower objects unless otherwise noted.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

The present disclosure provides various example locking systems to allow for effective operation with improved operation during fall instances. Various embodiments allow for a reduction in force against the guide member, such that the guide member is less likely to be worn and/or break during a fall instance. During a fall instance (e.g., an extended free fall), current fall arresting devices are fully reliant on the braking lever to appropriately move into contact with the guide member in order to slow and/or stop the movement of the fall arresting device along the guide member. As such, any failure of the braking lever can be catastrophic. The position of the braking lever can sometimes allow a user to accidentally cause the braking lever to operate incorrectly by providing a force against the braking lever that disengages the braking lever from the guide member. Various embodiments of the present disclosure allow for a secondary, "anti-panic" locking feature that operates independently of the braking lever and also engages with the guide member during a fall instance.

Figure 1A:
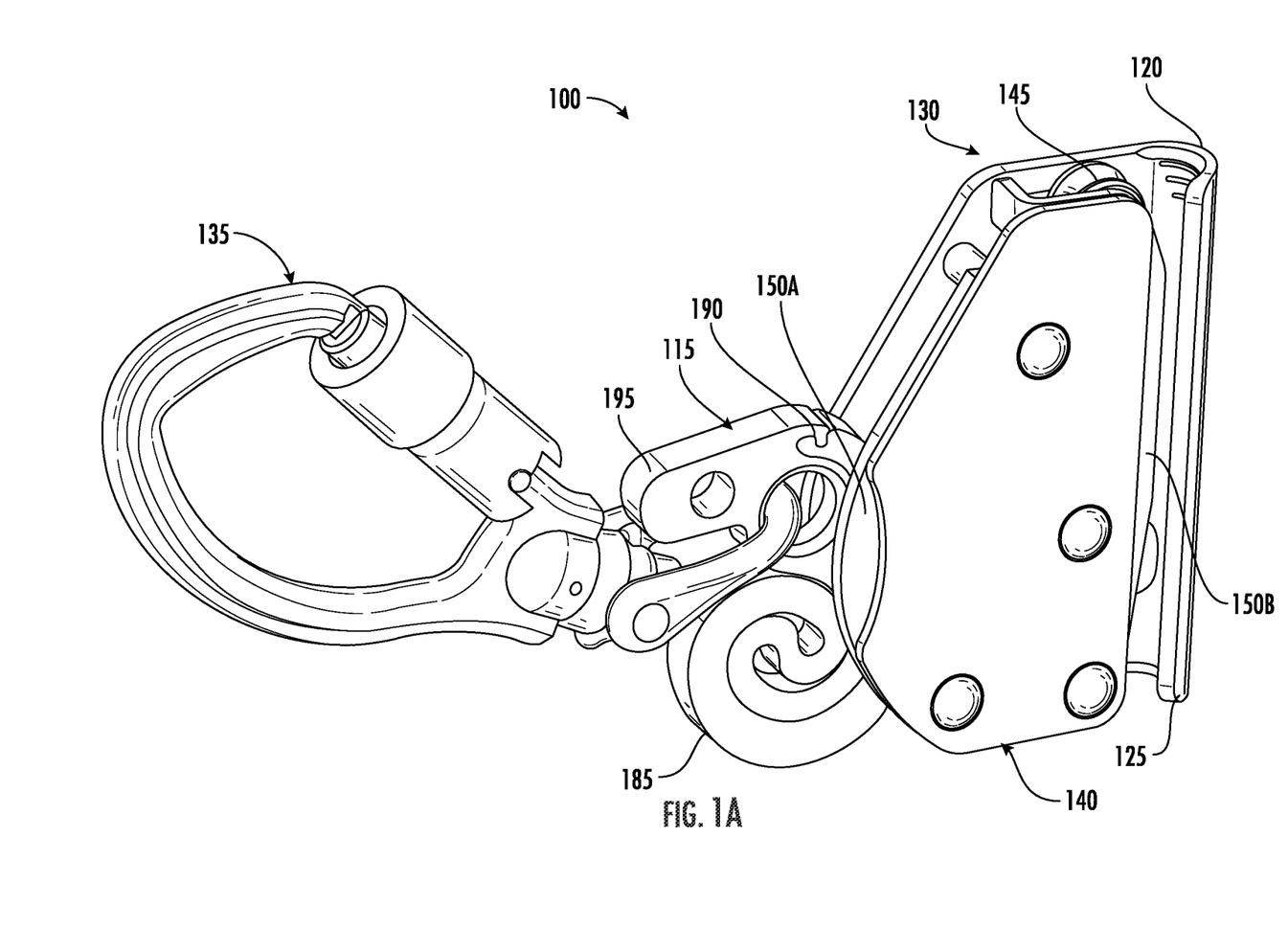
FIGS. 1A-1C are various exterior view of an example embodiment of a locking system in accordance with the present disclosure.
Figure 1B:
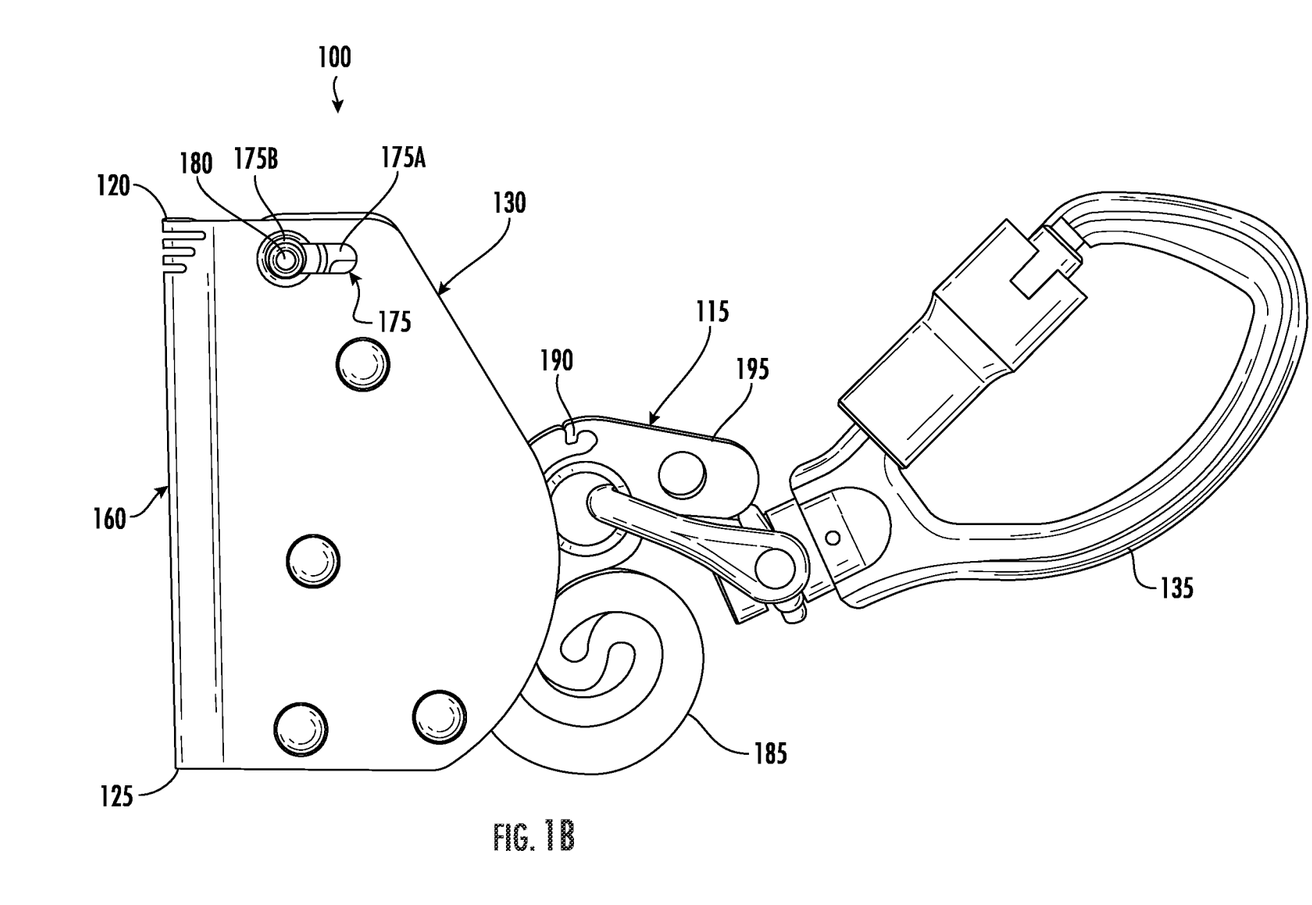
Figure 1C:
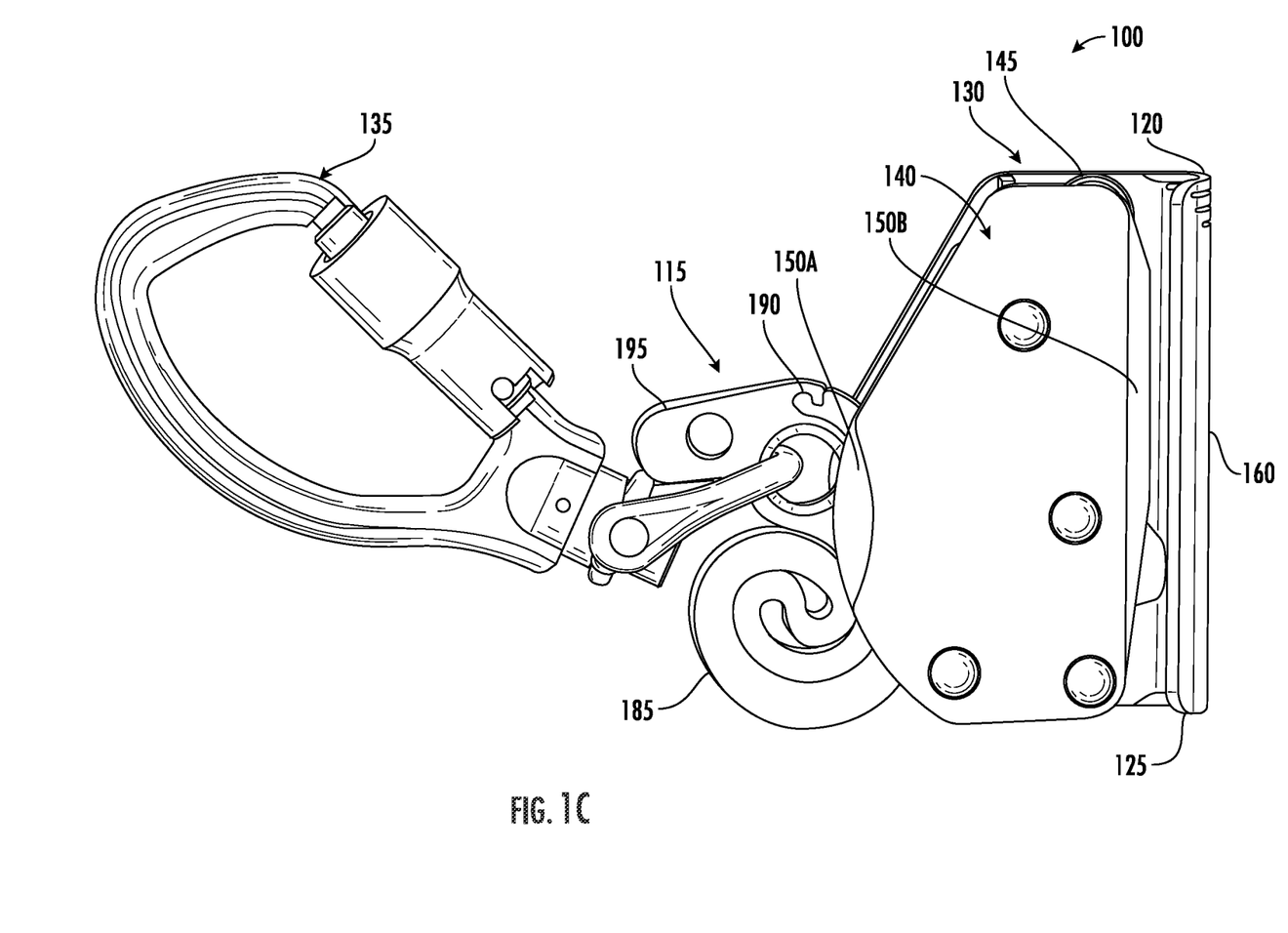

Referring now to FIGS. 1A-1C, various exterior views of the locking system 100 are provided. FIGS. 1B and 1C illustrate opposite side views of the locking system 100, while FIG. 1A illustrates a perspective view of the locking system 100 from generally the same side as the view shown in FIG. 1C. In various embodiments, the locking system 100 may include a braking lever 115, a housing 130, a connecting portion 135, and a cover plate 140.

In some example embodiments, the housing 130 may be configured with an upper end 120, a lower end 125, a proximal end, and a distal end. The distal end is the end proximate the guide member (not shown) and is substantially curved such that it defines a guide path 160. The distal end of the housing is sized to slideably receive a guide member (not shown), such as a rope, a cable, and/or the like. In some examples, the distal end is configured to partially surround a guide path 160 whereas in other examples the distal end is configured to completely surround the guide path 160. The proximal end is the end that is proximate the connecting portion and the wearer of the device.

Figure 2:
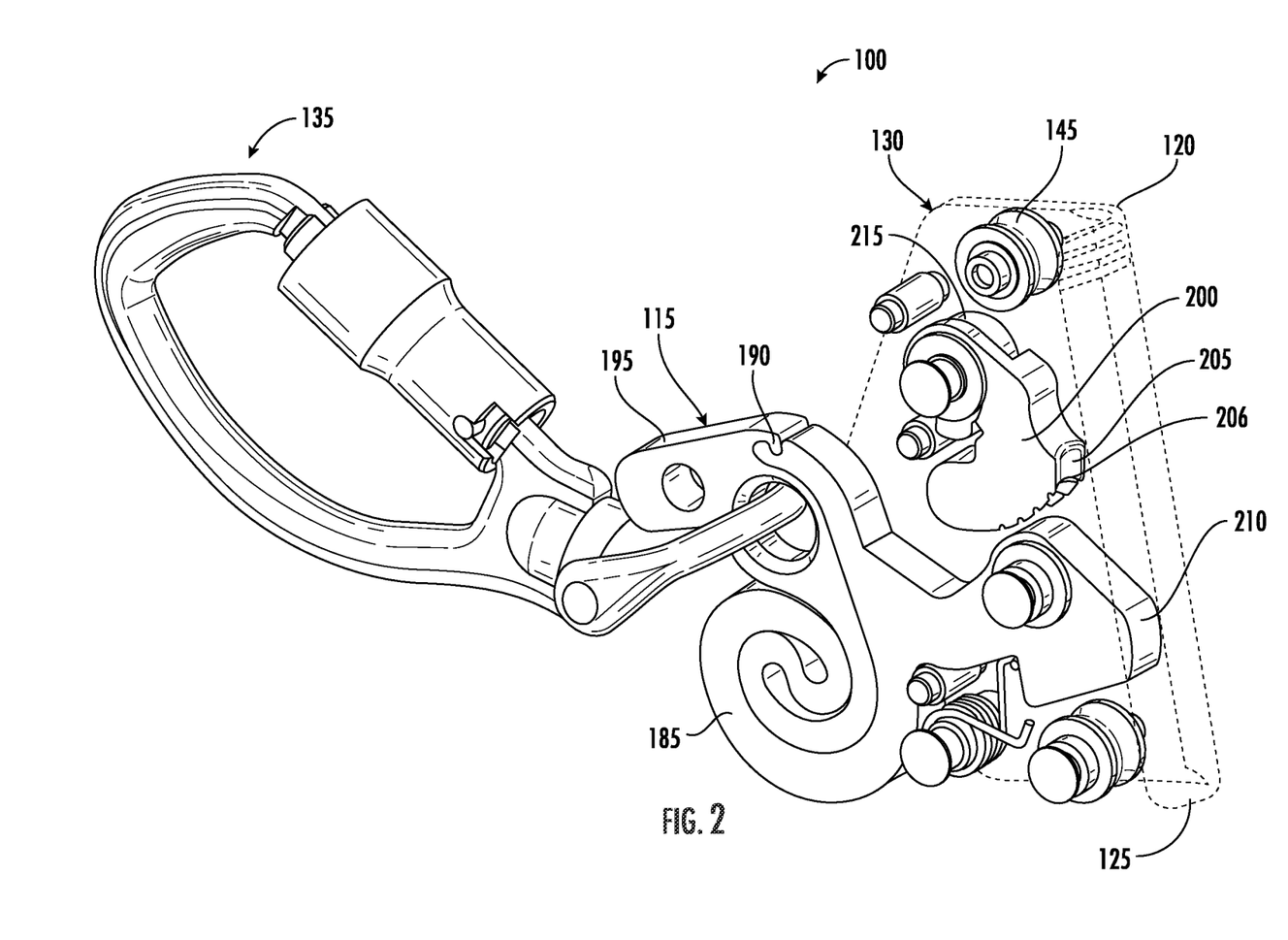
FIG. 2 is side view of the internal components of the locking system in the locked position in accordance with an example embodiment of the present disclosure.

As is shown in FIGS. 1A-1C, the cover plate 140 is positioned opposite to the housing 130 and is configured to cover at least a portion of one or more components of locking system. The cover plate 140 is secured to the housing 130 using one or more bolts, rivets, pins, or the like. For example, the rivets or pins used to hold various locking system components discussed in reference to FIGS. 2A and 2B below may be attached at either end to the housing 130 and the cover plate 140 respectively. In various embodiments, the housing 130 and the cover plate 140 may form a unitary piece. In some embodiments, as shown in FIG. 2A, the cover plate 140 may also have one or more guide wheel locking plate 150A, 150B disposed below the cover plate 140. In various embodiments, the guide wheel locking plate 150A, 150B may be affixed in place via the same components used to secure the housing 130 and the cover plate 140 (e.g., the guide wheel locking plate may be sandwiched between the cover plate 140 and the housing 130 using one or more bolts, rivets, pins, or the like).

A braking lever 115 is rotatably connected between the housing 130 and the cover plate 140 and comprises two arms 185, 195 that extend outwardly from the proximal end of the housing 130. One of the arms defines a shock absorber 185 configured to permanently deform in an instance in which an extreme fall instance occurs. In various embodiments, a fall instance may be defined as an instance in which a predetermined force is achieved, usually based on a user falling. In various embodiments, the locking system 100 may be designed based on the maximum falling speed of a user during operation. In various embodiments, the shock absorber 185 may include one or more hooks 190 configured to disengage from one another in an instance in which a force is applied to the connecting portion 135. A connecting portion 135, such as a carabiner, may be securely fastened to the braking lever 115 at an attachment end, such that when a force is applied to the connecting portion 135, the force causes the rotation and deformation of the braking lever 115.

The connecting portion 135 is configured to be directly or indirectly connected to a user. In various embodiments, the top arm 195 may be configured to engage with the connecting portion 135 such that the connecting portion 135 does not rotate above the top arm 195 (e.g., the connecting portion 135 may engage the top arm 195 instead of continuing to rotate in the clockwise direction). As such, the connecting portion 135 does not negatively affect the force of the fall on the shock absorber 185. For example, in an instance no top arm 195 is present, the connecting portion 135 may rotate beyond the location of the top arm 195 and the force will not cause the shock absorber 185 to deform.

As discussed in more detail below, the locking system 100 may include a guide wheel 145 configured to freely travel along the guide member, such that guide member 300 (shown in FIGS. 3A-3B) remains in the guide path 160 during operation. In various embodiments, a guide member assistor 310 may be installed on the guide member 300 to ensure the locking system 100 remains correctly engaged with the guide member 300 during operation. In some embodiments, as shown, the locking system 100 may include an adjustable engagement slot 175. In various embodiments, the engagement slot 175 may allow the user to manually move the guide wheel 145 via a thumb switch 180 (discussed in FIGS. 4A-4C) into a position to allow a guide member 300 to be inserted into the guide path 160. In various embodiments, the thumb switch 180 may be defined on the guide wheel 145. In various embodiments, the engagement slot 175 may define a disengaged portion 175A and an engaged portion 175B configured with different size openings. The disengaged portion 175A may be the area of the engagement slot 175 that in an instance in which the thumb switch is positioned therein that the guide wheel 145 does not engage the guide member 300. Alternatively, in an instance in which the thumb switch 180 is positioned in the engaged portion 175B, the guide wheel 145 may engage the guide member 300 (if present). In some embodiments, the thumb switch 180 may be biased via a spring, such as a cylindrical spring, in order for the thumb switch 180 to provide a resistance to against the engagement slot. 175. In some embodiments and in an instance the user engages the thumb switch 180 and moves the thumb switch 180 into the disengaged portion 175A, the guide wheel 145 may be moved enough to place the guide member 300 in the guide path 160. As is shown in FIGS. 1A-1C, the engagement slot 175 may be horizontal (e.g., perpendicular to the guide member 300 in an instance the guide member 300 is installed and may be defined by at least one of the housing 130 or the cover plate 140. For example, as shown, the engagement slot 175 may be defined on the housing 130 as shown in FIG. 1B.

Figure 3A:
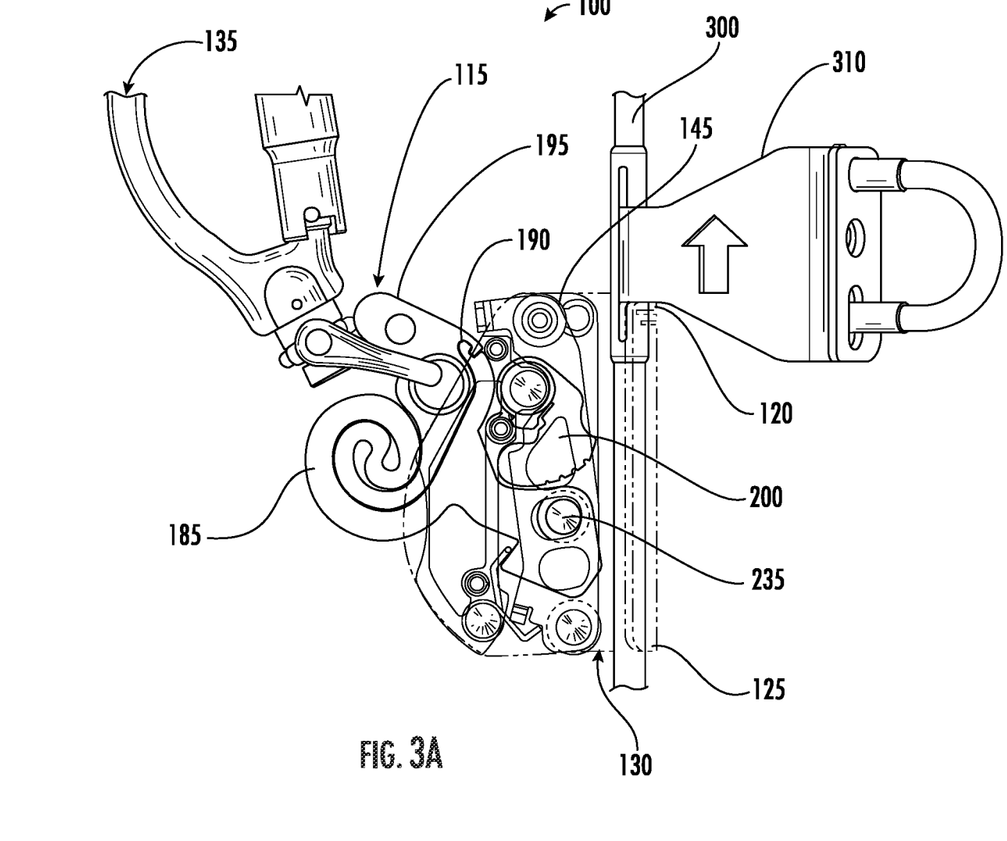
FIGS. 3A-3B are side views of the internal components of the locking system in the unlocked position (FIG. 3A) and the locked position (FIG. 3B) in accordance with an example embodiment of the present disclosure.
Figure 3B:
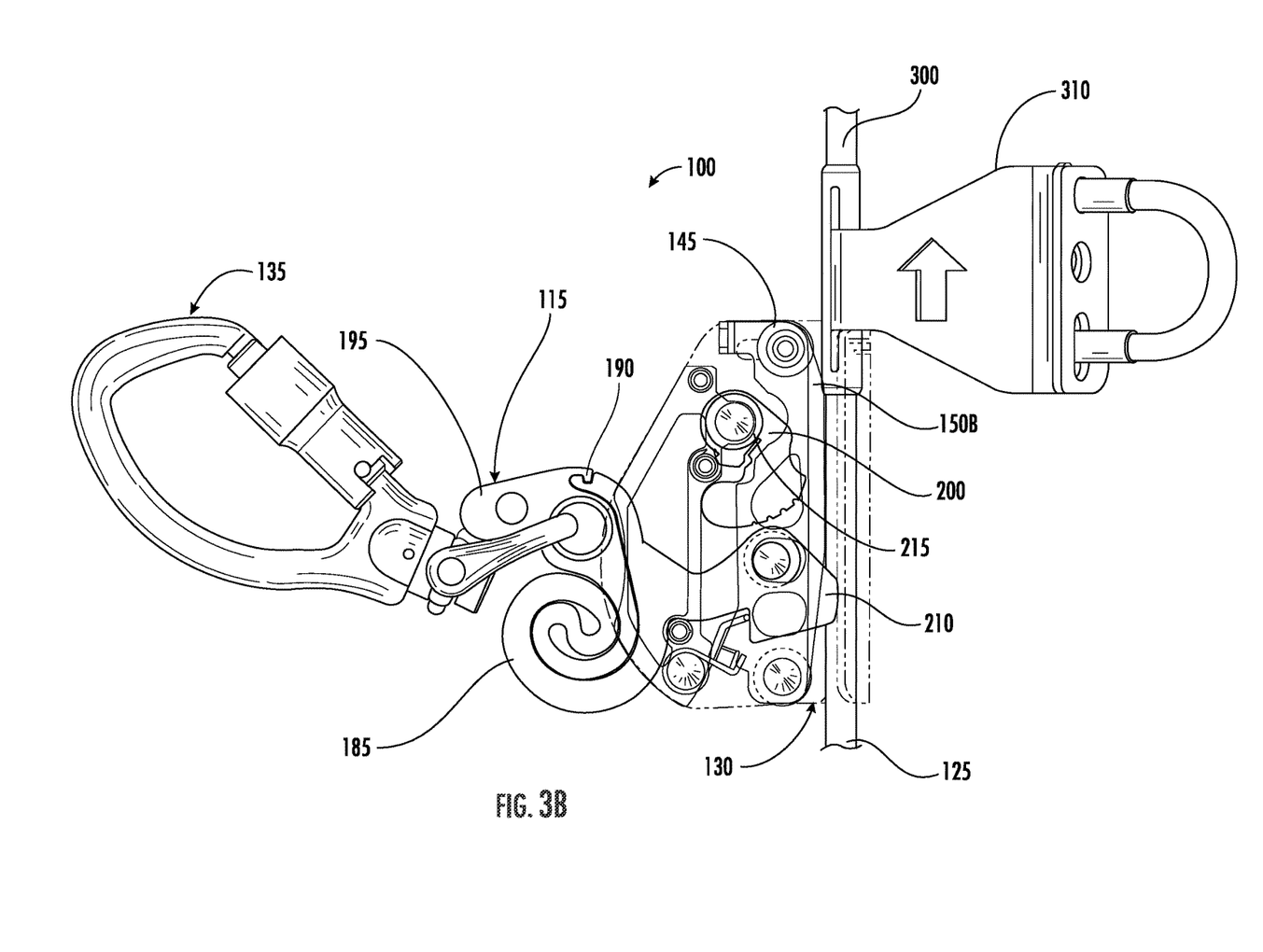

FIG. 2 illustrates a view of the locking system 100 with the cover plate 140 and removed. As shown, the locking system 100 includes at least a braking lever 115, a guide wheel 145, and a secondary braking feature 200. In various embodiments, the locking system 100 may move between a unlocked position (as is shown in FIG. 3A), wherein the locking system 100 travels along the guide member 300 with minimal resistance, and a locked position (as is shown in FIG. 3B). FIG. 2B illustrates the braking end 210 of the braking lever 115 positioned in the locked position, such that the braking end 210 may be engaged with the guide member to restrict and/or stop motion of the locking system 100 along the guide member 300 in an instance the locking system 100 is installed on a guide member 300. In various embodiments, the secondary braking feature 200 may be rotatably attached to at least one of the housing 130, the cover plate 140, or the guide wheel locking plate150A, 150B. In various embodiments, the secondary braking feature 200 may be an inertial system. For example, the secondary braking feature 200 may be spring biased such that the force of gravity holds the secondary braking feature 200 in place during operations. In an instance in which the locking system 100 is experiencing a fall instance, the force of gravity decrease on the secondary braking feature, such that the spring causes the braking surface 205 of the secondary braking feature 200 to rotate into contact with the guide member 300.

FIGS. 3A and 3B illustrate the movement of the braking lever 115 during a fall instance in accordance with an example embodiment. FIG. 3A illustrates the locking system 100 in the unlocked position, such that the locking system 100 may travel freely along the guide member 300 in an instance neither the braking lever 115 nor the secondary braking feature 200 are engaged with the guide member. As shown in FIG. 3A, in the unlocked position, the braking lever 115 may be spring biased such that the braking lever is not allowed to rotate about the braking center of rotation 235. In various embodiments, the locking system 100 may be able to withstand a threshold level of force on the connecting portion 135 without causing the braking lever 115 and the secondary braking feature 200 to engage the guide member 300. For example, the locking system 100 may be configured to withstand the force of a user during normal operating conditions (e.g., repealing) and may only activate the braking lever 115 and/or the secondary braking feature 200 in an instance a certain force (e.g., a user falling at a certain speed) has been reached. In various embodiments, the activation force for the braking lever 115 and the secondary braking feature 200 may be based on the design of each component.

In some examples, the braking lever 115 may be configured with a plurality of pins or other coupling mechanisms that are operably coupled together during typical operation. As shown by shock absorber 185, the braking lever 115 may be coiled and/or bent in such a way that the in an instance in which a force upon the braking lever exceeds a certain threshold, the hooks 190 may be urged to decouple. For example, during a fall instance the force of the connecting portion 135 downward causes the top arm portion 195 of the braking lever 115 to exert a force at the hooks 190 until the hooks are forcibly uncoupled and the shock absorber 185 becomes unwound. In various embodiments, the shock absorber 185 may be configured to dampen any extreme forces, such as from a fall instance. In such an instance, the decoupling may alone indicate that the locking system 100 has withstood a certain fall instance that requires the locking system 100 to be replaced. In various embodiments, as shown, the shock absorber 185 may define a double-spiral deformation shape. As such, the double-spiral deformation shape may allow for maximized absorbing energy with minimal weight of absorber for dedicated material. Additionally, the double spiral deformation shape allows for additional structure which prevents risky orientation of the connecting portion 135 during operation. In various embodiments, the double spiral shock absorber 185 may improve comfort during normal usage, as well as allow for implementation of stronger spring for faster reaction to fall event. In various embodiments, other shaped shock absorbers may be used in the locking system 100 discussed herein.

Referring now to FIG. 3B, an example fall instance instance is shown using a locking system 100 of an example embodiment. In various embodiments and during a fall instance, the braking lever 115 may be allowed to rotate such that the braking end 210 of the braking lever 115 engages with the guide member 300. Additionally or alternatively, the braking lever 115 may be released to rotate based on the motion of the locking system 100 along the guide member 300. In some embodiments, the force of the connecting portion 135 on the braking lever 115 may cause the braking lever 115 to rotate and disengage from an engagement member or the like. In an instance the engagement member or the like disengages from the braking lever 115, the braking lever 115 may rotate in the downward direction (e.g., counterclockwise as shown from FIGS. 3A and 3B) such that the braking end 210 of the braking lever 115 forcibly engages the guide member 300. In some embodiments, the locking system 100 may include a spring to dissipate the rotational force of the braking lever 115 (e.g., to avoid the braking lever from damaging and/or breaking the guide member 300).

Figure 4A:
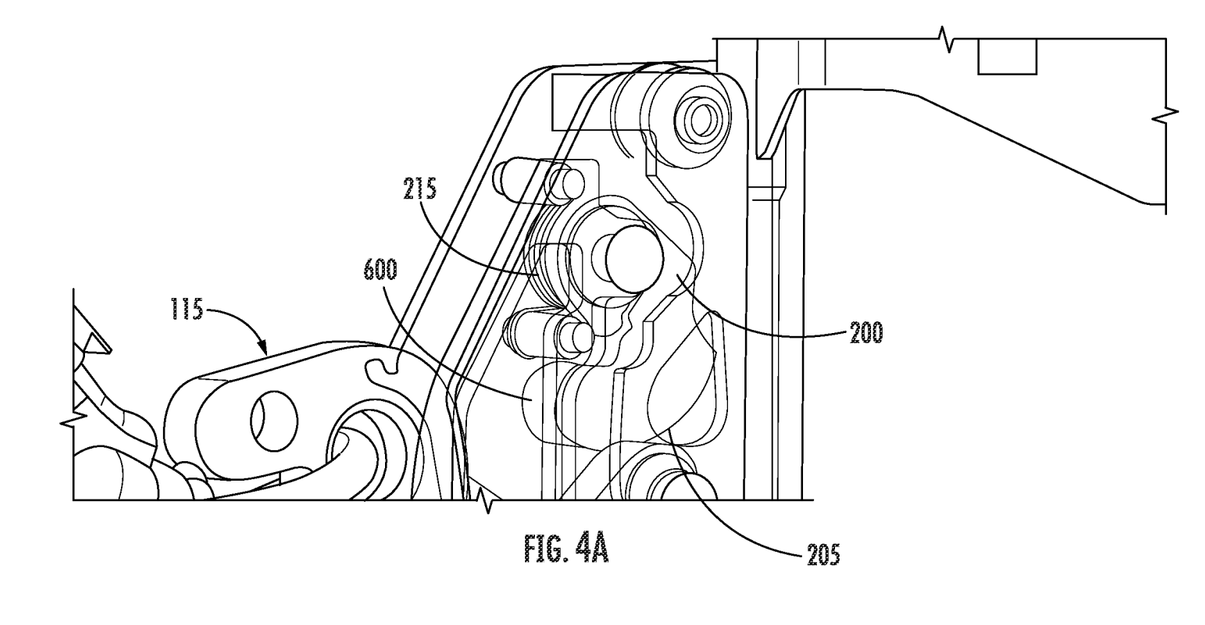
FIGS. 4A-4B illustrate the secondary locking braking lever in the unlocked position (FIG. 4A) and the locked position (FIG. 4B) in accordance with an example embodiment.
Figure 4B:
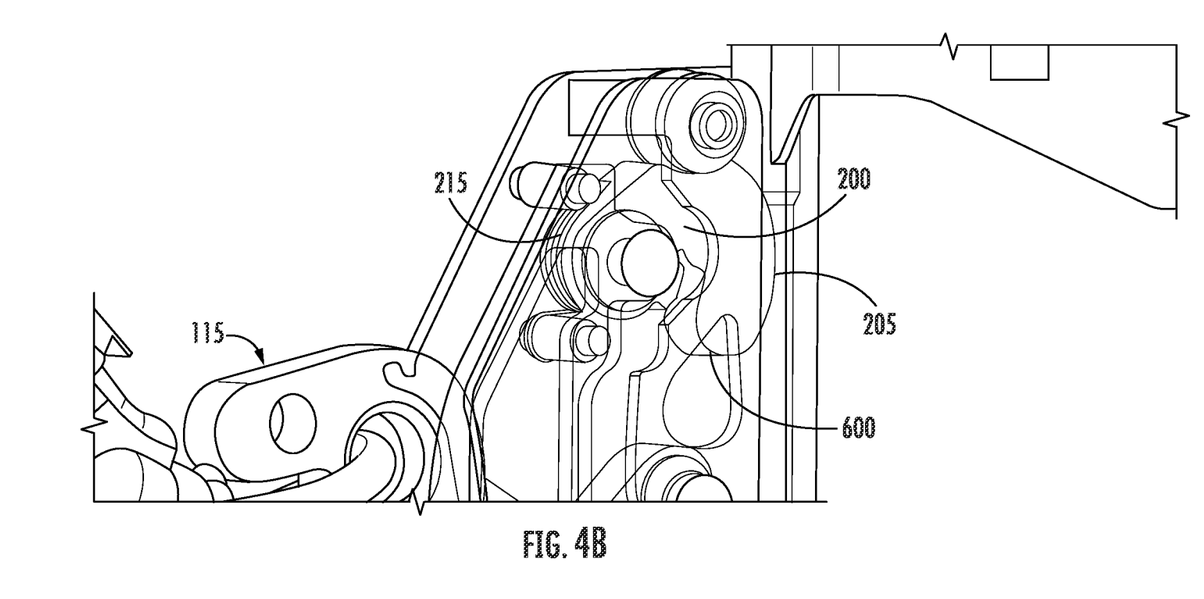

Referring now to FIGS. 4A and 4B, the secondary braking feature 200 is shown in the unlocked position (FIG. 4A) and the locked position (FIG. 4B) in accordance with example embodiments. FIG. 4A illustrates the secondary braking feature 200 in the unlocked position, even in an instance in which the braking lever 115 is engaged with the guide member 300. As shown, the secondary braking feature 200 may be rotatably attached to at least one of the housing 130, the cover plate 140, or the guide wheel locking plate150A, 150B. In various embodiments, the secondary braking feature 200 may be an inertial system. In various embodiments, the secondary braking feature 200 may be shaped such that the center of gravity of the secondary braking feature 200 is towards the braking surface 205 of the secondary braking feature. In various embodiments, the secondary braking feature 200 may include a pre-loaded spring 215 configured to counteract the force of gravity on the secondary braking feature 200. As such, in an instance the locking system 100 is not moving or moving slowly, the force due to gravity may be counteracted by the spring 215, such that the secondary braking feature 200 has minimal to no rotational movement. In an instance in which the locking system 100 is experiencing a fall instance, the force of gravity may decrease on the secondary braking feature. In such an instance, the force from the spring 215 has little or no counter force due to gravity and causes the secondary braking feature to rotate in the counter clockwise position, such that the braking surface 205 of the secondary braking feature 200 rotates into contact with the guide member 300 as shown in FIG. 4B.

In various embodiments, the braking surface of the secondary braking feature 200 may be curved, as shown, in order to increase the grip of the surface with the guide member 300 during operation. As such, the secondary braking feature may climb up the guide member 300, such that the secondary braking feature provides an upward force in addition to the stopping force of a typical braking surface. Additionally, the braking surface 205 may have indentions or grooves (e.g., groove 206 shown in FIG. 6) configured to engage the guide member 300. As shown, the secondary braking feature 200 may be completely independent of the braking lever 115, such that it may provide a stopping force in an instance in which the braking lever does not function correctly. Additionally, it may provide additional stopping force in an instance in which the braking lever 115 is operating properly.

Figure 5A:
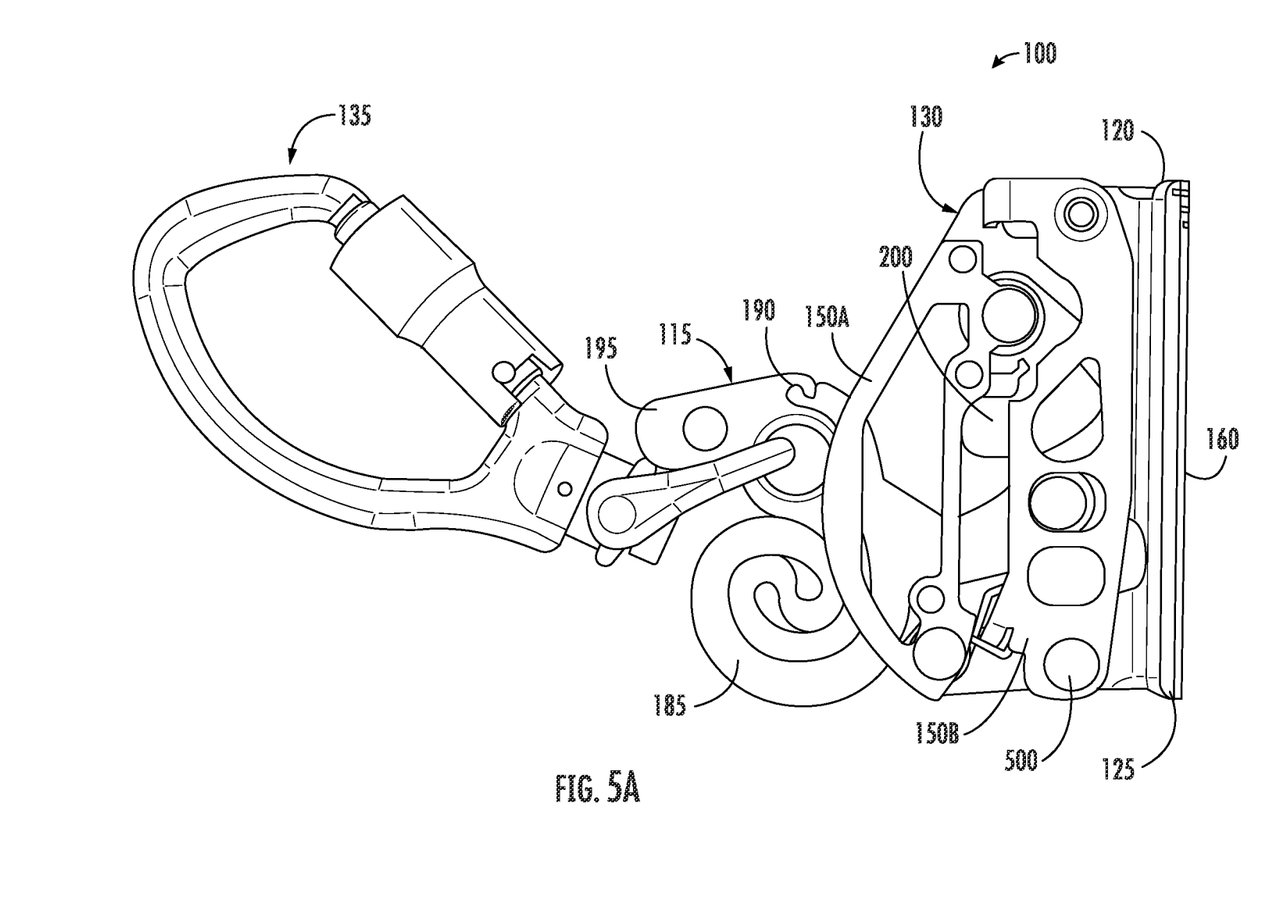
FIG. 5A is side view of the internal components of the locking system including the guide wheel locking plates in accordance with an example embodiment of the present disclosure

FIG. 5A illustrates the guide wheel locking plate 150B configured to have a pivot point 500 near the lower end 125 of the housing 130 (e.g., opposite the guide wheel 145). As such, the guide wheel locking plate 150B may be configured to rotate about the pivot point 500 in an instance in which the thumb switch 180 moves within the engagement slot 175. As such, the guide wheel 145 also rotates away from the guide path 160 to allow for a guide member 300 to be installed and/or removed from the guide path 160. In various embodiments, another guide wheel locking plate 150A may be affixed to the housing 130 and/or the cover plate 140, such that the guide wheel locking plate 150A provides a rotational stop to the guide wheel locking plate 150B during movement of the thumb switch 180. As shown, the guide wheel locking plate 150B may have one or more apertures to allow for attachments of other components to be made to the cover plate 140.

Figure 5B:
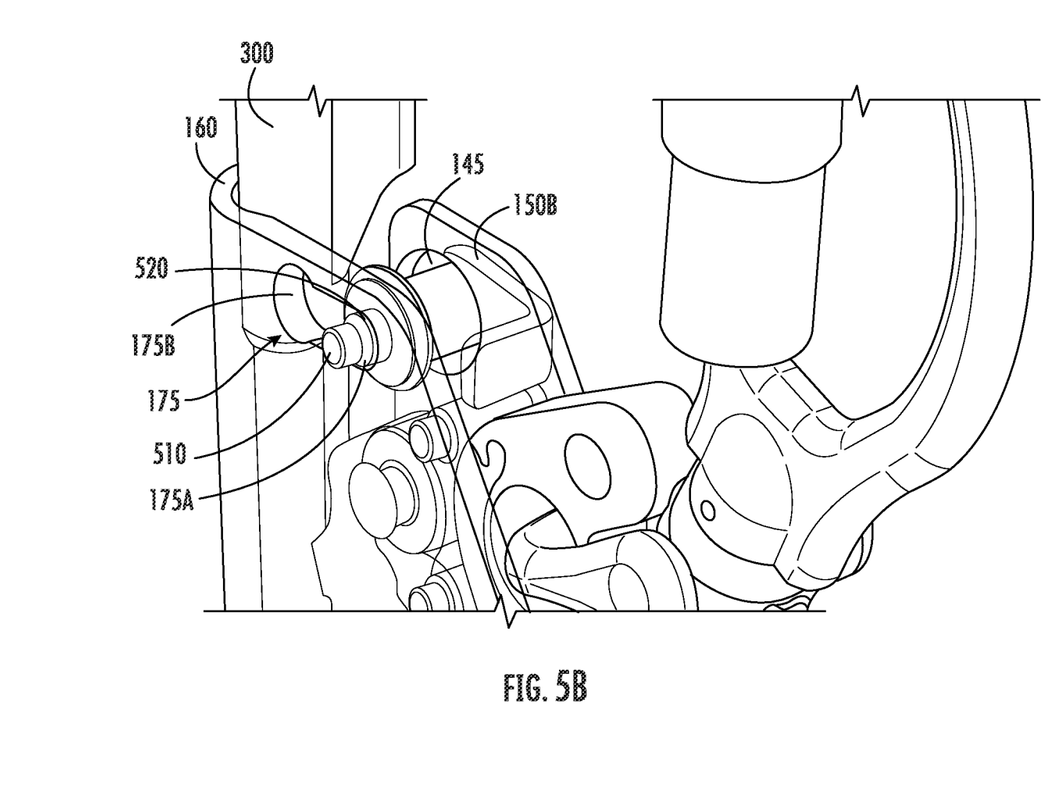
FIGS. 5B-5D illustrate the thumb switch used for moving the guide wheel between an engaged position and a disengaged position based on the location of the thumb switch within the engagement slot in accordance with an example embodiment of the present disclosure.
Figure 5C:
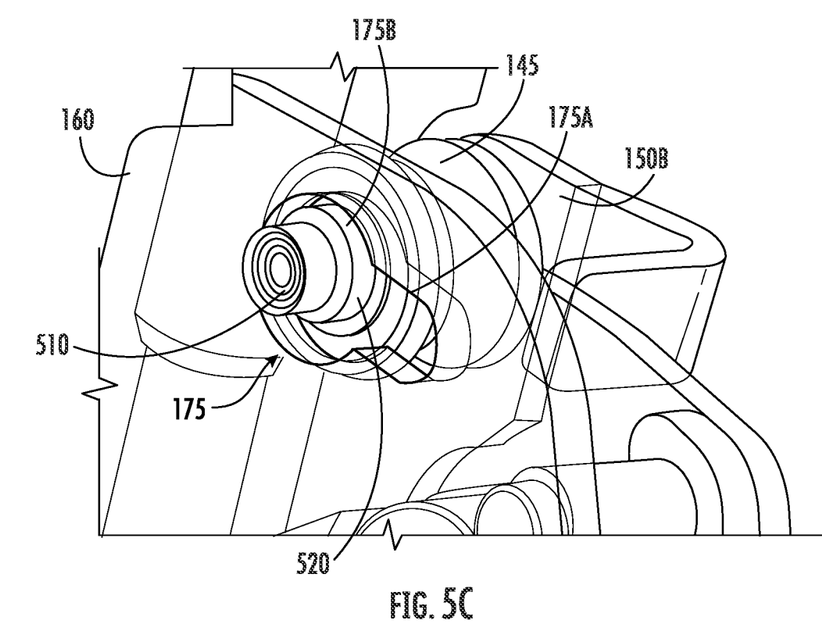
Figure 5D:
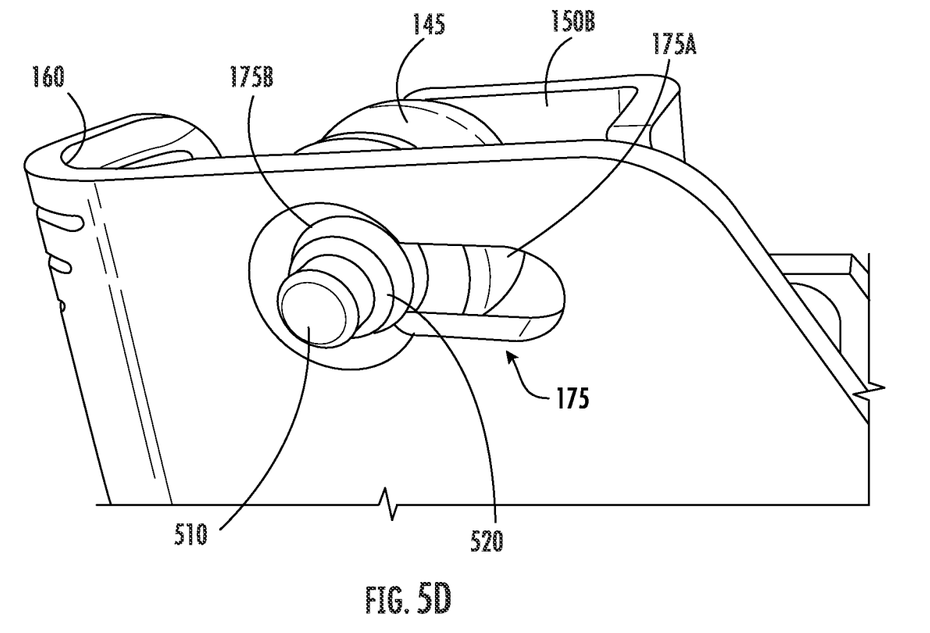

FIGS. 5B-5D illustrate various views of the thumb switch 180 configured to control the position of the guide wheel 145 based on the position of the thumb switch 180 in the engagement slot 175. FIG. 5B illustrates the thumb switch 180 in the disengaged position, such that the guide wheel 145 may not be in position to engage the guide member 300. In various embodiments, the thumb switch 180 may have an outer button 510 and an inner button 520, such that the outer button 510 defines a smaller cross-sectional area than the inner button 520. During various embodiments, the disengaged portion may define a thickness that is greater than the diameter of the inner button 520, but less than the diameter of the outer button 510, such that the thumb switch 180 may be depressed (e.g. via the internal spring) to allow the inner button 520 to travel along the disengaged portion 175A of the engagement slot (e.g., the inner button 520 travels below the disengaged portion 175A while the outer button 510 travels in the disengaged portion 175A). In various embodiments, the thumb switch 180 may be positioned in the disengaged position 175A in an instance in which the guide member 300 is being loaded and/or unloaded from the guide path 160 of the locking system 100.

As shown in FIG. 5C-5D, as the thumb switch 180 is moved from the disengaged portion 175A into the engaged portion 175B, the guide wheel 145 may be move towards the guide path 160, such that the guide wheel 145 may engage with the guide member 300. For example, as the thumb switch 180 is moved towards the guide path 160, the guide wheel locking plate 150B pivots about the pivot point 500 in the clockwise direction towards the guide path. In various embodiments, the engaged portion 175B of the engagement slot defines a diameter that is greater than both the inner button 520 and the outer button 510, such that in an instance the thumb switch 180 is in the engaged portion 175B of the engagement slot 175, the internal spring expands allowing the entire thumb switch 180 (e.g., both the inner button and the outer button to fit into the engaged portion 175B) be located in the engagement slot 175. In various embodiments, the thumb switch 180 may be configured to remain in the engaged portion 175B unless activated. As such, due to the size of the disengaged portion 175A, the inner button 520 may not be able to travel along the disengaged portion 175A, such that the thumb switch 180 remains in the engaged portion 175B until the thumb switch 180 is depressed such that the inner button 520 does not interfere with the travel of the outer button 510 along the disengaged portion 175A. In various embodiments, the engagement slot 175 may be produced via laser, water-jet cutting, machining, and/or the like.

Figure 6:
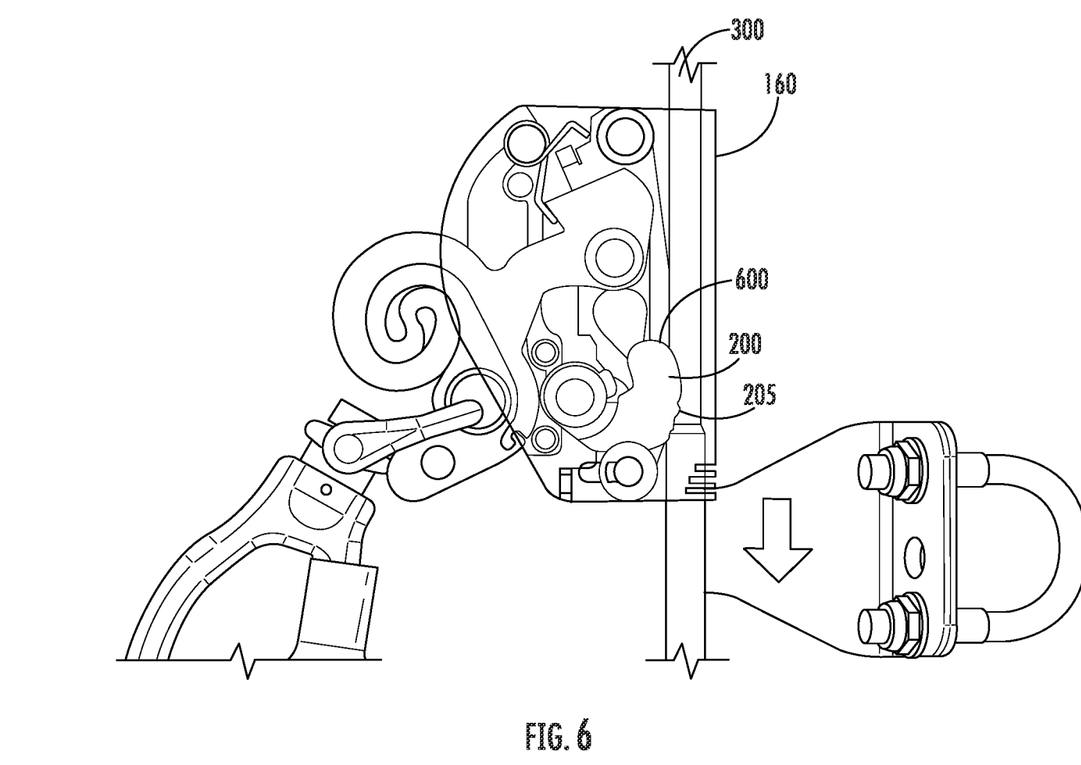
FIG. 6 illustrates the secondary braking lever in an instance in which the locking system is being installed in the incorrect orientation in accordance with an example embodiment.

FIG. 6 illustrates the operations of the secondary braking feature in an instance the locking system 100 is installed incorrectly on the guide member 300. As shown, in an instance in which a user is attempting to install the locking system 100 upside-down, the secondary braking feature 200 may be configured to block the guide path 160, such that the guide member 300 may not be inserted. As discussed above, when installed in the correct orientation, the spring 215 is configured to provide a force in the counter-clockwise direction, which is opposite of the force provided by gravity, as the secondary braking feature's center of gravity is biased towards the braking surface 205. However, in an instance in which the locking system 100 is installed in the wrong orientation, the spring 215 acts in the same direction as the gravitational force (e.g., in the clockwise direction for the secondary braking feature shown in FIG. 6), such that the secondary braking feature 200 may rotate clockwise into the guide path 160. In some embodiments, the braking surface 205 may be shaped such that the end of the braking surface 600 engages the guide path 160 and stops the rotation of the secondary braking feature 200. In various embodiments, the secondary braking feature 200 may also cause the guide wheel locking plate 150B to pivot into the engaged position (e.g., the thumb switch 180 is in the engaged portion 175B of the engagement slot 175).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A locking system for fall protection, the locking system comprising:
    a housing, wherein the housing defines a guide path through which the housing is slideably attached to a guide member; and
    a braking lever having a braking end that is configured to engage the guide member, wherein the braking lever comprises a shock absorber configured to deform during a fall instance;
    a secondary braking feature configured independent from the braking lever, wherein the secondary braking feature is an inertial structure configured to rotate into engagement with the guide member during the fall instance.

2. The locking system of claim 1, wherein the secondary braking feature defines a braking surface, wherein a center of gravity of the secondary braking feature is towards the braking surface.

3. The locking system of claim 1, wherein the secondary braking feature is spring biased against rotation due to gravity in an instance in which the locking system has little or no movement.

4. The locking system of claim 2, wherein the braking surface of the secondary braking feature defines a curvature, such that the braking surface is able to grip the guide member.

5. The locking system of claim 4, wherein the braking surface of the secondary braking feature further defines one or more grooves configured to increase the friction between the secondary braking feature and the guide member.

6. The locking system of claim 1, further comprising a guide wheel assembly, wherein the guide wheel assembly comprises a guide wheel locking plate pivotally attached to the housing and a thumb switch configured to move between an engaged position and a disengaged position within an engagement slot.

7. The locking system of claim 6, wherein the thumb switch defines an inner button and an outer button and the engagement slot defines an engaged portion and a disengaged portion.

8. The locking system of claim 7, wherein the engaged portion of the engagement slot defines a diameter that is greater than the diameter of the inner button and the outer button.

9. The locking system of claim 8, wherein the disengaged portion of the engagement slot defines a thickness that is greater than the diameter of the outer button and the thickness is less than the diameter of the inner button, wherein the thumb switch must be depressed in an instance in which the thumb switch is travelling through the disengaged portion.

10. The locking system of claim 6, wherein the guide wheel and the thumb switch are concentric.

11. The locking system of claim 1, wherein the shock absorber defines a double spiral shape.

12. A method of manufacturing a locking system for fall protection, the method comprising:
    providing a housing, wherein the housing defines a guide path through which the housing is slideably attached to a guide member; and
    rotatably attaching a braking lever having a braking end that is configured to engage the guide member and wherein the braking lever comprises a shock absorber configured to deform during a fall instance;
    rotatably attaching a secondary braking feature configured independent from the braking lever, wherein the secondary braking feature is an inertial structure configured to rotate into engagement with the guide member during the fall instance.

13. The method of claim 12, wherein the secondary braking feature defines a braking surface, wherein a center of gravity of the secondary braking feature is towards the braking surface.

14. The method of claim 12, wherein the secondary braking feature is spring biased against rotation due to gravity in an instance in which the locking system has little or no movement.

15. The method of claim 13, further comprising providing a curvature along the braking surface of the secondary braking feature, such that the braking surface is able to grip the guide member.

16. The method of claim 15, further comprising providing one or more grooves along the braking surface of the secondary braking feature configured to increase the friction between the secondary braking feature and the guide member.

17. The method of claim 12, further comprising attaching a guide wheel assembly to the housing, wherein the guide wheel assembly comprises a guide wheel locking plate pivotally attached to the housing and a thumb switch configured to move between an engaged position and a disengaged position within an engagement slot.

18. The method of claim 17, wherein the thumb switch defines an inner button and an outer button and the engagement slot defines an engaged portion and a disengaged portion.

19. The method of claim 18, wherein the engaged portion of the engagement slot defines a diameter that is greater than the diameter of the inner button and the outer button.

20. The method of claim 19, wherein the disengaged portion of the engagement slot defines a thickness that is greater than the diameter of the outer button and the thickness is less than the diameter of the inner button, wherein the thumb switch must be depressed in an instance in which the thumb switch is travelling through the disengaged portion.

21. The method of claim 17, wherein the guide wheel and the thumb switch are concentric.

22. The locking system of claim 12, wherein the shock absorber defines a double spiral shape.

* * * * *